G. J. LOWRES.
EYEGLASS MOUNTING.
APPLICATION FILED JUNE 12, 1911.
1,054,222.
Patented Feb. 25, 1913.
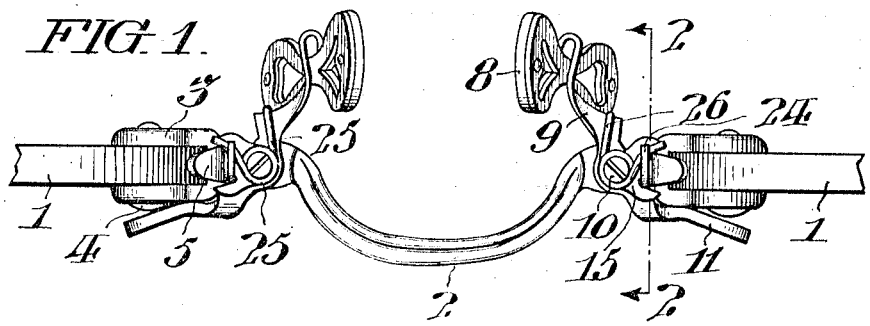
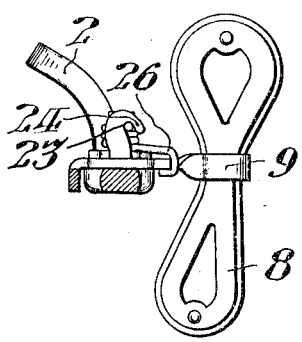
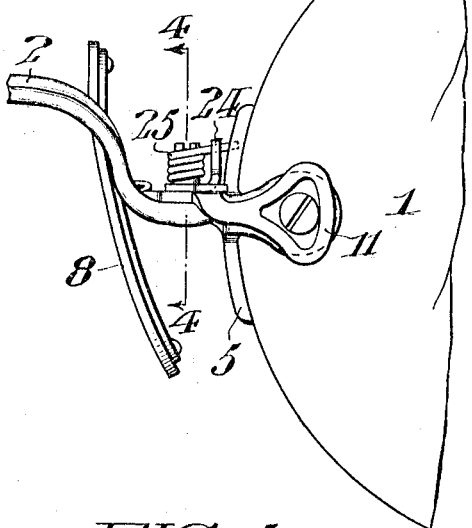
WITNESSES
Carrie E. Kleinfelder.
William Conway.
INVENTOR
George J. Lowres
BY Cyrus N. Anderson
ATTORNEY

UNITED STATES PATENT OFFICE.

GEORGE J. LOWRES, OF NEWARK, NEW JERSEY, ASSIGNOR TO LOWRES OPTICAL COMPANY, A CORPORATION OF NEW JERSEY.

EYEGLASS-MOUNTING.

1,054,222.

Specification of Letters Patent. Patented Feb. 25, 1913.

Application filed June 12, 1911. Serial No. 632,597.

*To all whom it may concern:*

Be it known that I, GEORGE J. LOWRES, a citizen of the United States, residing in the city of Newark, county of Essex, State of New Jersey, have invented certain new and useful Improvements in Eyeglass-Mountings, of which the following is a specification.

My invention relates to improvements in eyeglass mountings and more particularly to those of the type commonly designated as finger-piece mountings.

One object of my invention is to provide an improved means for securing and anchoring in position the springs employed for causing the nose grips to grip the nose.

A further object is to provide means whereby the said springs may be removed and replaced by others, if desired, by any one, whether skilled or unskilled in the art pertaining to eyeglass mountings, without disturbing the relation of or removing the other parts of the structure.

Other objects and advantages will be referred to in the detailed description which follows of my invention or will be apparent from such description.

One convenient form of embodiment of my invention is illustrated in the accompanying drawings forming a part of this specification but it will be understood that changes in the details of construction may be made within the scope of the claims without departing from said invention.

In the drawings: Figure 1 is a top plan view of a pair of eyeglasses, portions of the lenses being broken away, showing my invention; Fig. 2 is a transverse section on the line 2—2 of Fig. 1; Fig. 3 is a front elevation of the inner portion of one of the lenses and the adjacent end portion of the mounting illustrated in Fig. 1; Fig. 4 is a transverse section on the line 4—4 of Fig. 3; and Fig. 5 is a view showing in enlarged detail the blank from which the spring anchoring member is formed.

Referring to the drawings, 1 designates the lenses and 2 the bridge by means of which the lenses are united or connected together. The lenses are, as usual, connected to the opposite ends of the bridge by means of the straps 3, the latter being connected to the lenses by means of the screws 4. The straps are provided with stays or braces 5 by means of which movement of the lenses 1 about the screws 4 as pivots is prevented.

The nose grips 8 are mounted upon the rear ends of the arms or levers 9 which are pivoted upon the pivots 10 which are connected to the opposite ends of the bridge 2 and in the construction as illustrated project from the upper side thereof. These pivots 10 may be secured in any suitable manner to the bridge but in the construction as illustrated they are provided with screw threads which engage screw threads formed in holes provided in the opposite ends of the bridge. The arms or levers 9 are provided with forwardly projecting finger portions 11 by means of which the levers or arms and the nose grips carried thereby are moved about their pivots 10 in order that the glasses may be placed on and removed from the nose of the wearer. The pivots 10 project through openings 12 in the arms or levers 9 and the latter rest against the upper side of the opposite end portions of the bridge.

Located upon the pivots and in contact with the upper sides of the arms or levers 9 are spring anchoring members 15. The said members are prevented from slipping upwardly over the pivots 10 by means of shoulders 16 on the said pivots. The pivots extend through the openings 17 in the said anchoring members. These members are notched, as indicated at 20, to form the projecting fingers 21 at the opposite edges of the said members which fingers, when the anchoring member is in position as indicated in the drawings, are located upon opposite sides of the stays or braces 5 at the opposite ends of the bridge for the purpose of preventing movement of the anchoring members 15 about the pivots 10. The central tongue-like finger 22 of the anchoring member 15 is bent upwardly substantially at right angles, as is indicated very clearly in Fig. 3 of the drawings, and the outer upper end of the said finger 22 is provided with a notch 23 which forms a hook 24 upon the said finger as shown very clearly in Fig. 2 of the drawings. Preferably the said hook extends toward the rear of the glasses.

25 designates helical springs which are coiled around the pivots 10. After a spring has been placed in position upon a pivot 10 one end thereof is placed in position in the notch 23 underneath the hook 24 while the other end thereof which is provided with a hook 26 is placed in engagement with the adjacent arm or lever 9. The action of the said spring (and the construction, arrangement and action of both of the said springs is identical) is to hold the arm or lever 9 and the nose grip secured thereto inwardly so as to cause the nose grips to grip the nose and hold the glasses firmly in position.

By the construction, as illustrated, it will be seen that either one of the springs may be readily removed from the pivot 10 by removing the end thereof from underneath the hook 24 and thereafter sliding the spring longitudinally from the said screw pivot and disengaging the hook 26 from the arm or lever 9. Such a construction is of great practical advantage and utility in that it will enable manufacturers of optical supplies to manufacture and supply separate springs which may be furnished to opticians and others engaged in the fitting and handling of eyeglasses to replace old and weakened or broken springs with new ones whenever such replacement shall become necessary or desirable.

In the construction as illustrated, wherein the screw pivots 10 are removable, should one of the anchorage or anchoring members 15 become broken or weakened from any cause, a new anchorage member may be substituted therefor by unscrewing the proper pivot 10 and placing the reduced screw threaded end portion thereof through the hole or opening 17 and thereafter re-screwing the said pivot in place.

By the employment of my invention any one having a spring in his or her possession and desiring to place the same in position to hold the nose grip or grips in proper position may readily do so even though not possessed of the tools usually employed by opticians in the fitting and arranging of eyeglass mountings.

Having thus described my invention, I claim:—

1. In a pair of eyeglasses the combination of the lenses, a bridge or equivalent means for connecting the lenses together, pivots at the opposite ends of the said bridge, nose grips, levers for supporting the said nose grips, which levers are pivoted upon the said pivots, spring anchoring devices secured upon the said pivots, the said devices being provided with a projecting finger having a hook thereon, helical springs coiled about the said pivots, one end of the said springs being in contact with the said arms or levers and the opposite ends of the said springs being in detachable engagement with the hooks upon the said anchorage members.

2. In a pair of eyeglasses, the combination of the lenses, a bridge or equivalent means for connecting the said lenses together, nose grips, pivoted levers for supporting the said nose grips, spring anchoring devices secured to the opposite ends of the said bridge, the said devices being provided with fingers which project upon opposite sides of a portion of the eyeglass mounting connected to the said lenses, and the said anchoring devices being provided with upturned projecting fingers provided with hooks and helical springs detachably secured to the opposite ends of the said bridge one end of each of the said springs being in contact with the said levers and the opposite ends of the said spring being in detachable engagement with the said hooks, whereby the said springs may be removed and replaced by others at will.

3. In a pair of eyeglasses, the combination of the lenses, a bridge or equivalent means for connecting the said lenses together, stays or braces engaging the edges of the lenses to prevent pivotal movement thereof, pivots secured to the opposite ends of the said bridge or equivalent means, nose grips, levers for supporting the said nose grips, which levers are pivoted upon the said pivots, spring anchoring devices located and secured upon the said pivots, the said devices being provided with outwardly projecting fingers which are located upon opposite sides of one of the stays or braces at each end of the bridge or equivalent device to hold the said anchoring devices against pivotal movement and the said anchoring devices being provided with upwardly projecting fingers provided with hooks, helical springs located upon the said pivots above the said anchoring devices, one end of each of the said springs being in engagement with one of the said arms or levers, and the opposite ends of the said springs being in engagement with the hooks upon the said spring anchoring devices whereby the said springs are detachably secured upon the said pivots.

In testimony that I claim the foregoing as my invention, I have hereunto signed my name this eighth day of June, A. D. 1911.

GEORGE J. LOWRES.

In the presence of—
 AUGUST ROEMMELE,
 CHARLES WALDEK.

---

Copies of this patent may be obtained for five cents each, by addressing the "Commissioner of Patents, Washington, D. C."